United States Patent
Elalouf

(10) Patent No.: US 11,530,499 B2
(45) Date of Patent: Dec. 20, 2022

(54) KNITTING NEEDLES

(71) Applicant: Knitting Fever, Inc., Amityville, NY (US)

(72) Inventor: Sion Elalouf, Sands Point, NY (US)

(73) Assignee: Knitting Fever, Inc., Amityville, NY (US)

(*) Notice: Subject to any disclaimer, the term of this patent is extended or adjusted under 35 U.S.C. 154(b) by 268 days.

(21) Appl. No.: 15/960,579

(22) Filed: Apr. 24, 2018

(65) Prior Publication Data

US 2018/0327943 A1 Nov. 15, 2018

Related U.S. Application Data

(60) Provisional application No. 62/504,612, filed on May 11, 2017.

(51) Int. Cl.
*D04B 3/02* (2006.01)
*B27K 3/02* (2006.01)
(Continued)

(52) U.S. Cl.
CPC .............. *D04B 3/02* (2013.01); *B27K 3/0278* (2013.01); *B27K 3/08* (2013.01); *B27K 3/15* (2013.01);
(Continued)

(58) Field of Classification Search
CPC ........ D04B 3/02; B27K 5/001; B27K 3/0278; B27K 3/15; B27K 3/08; B27K 5/02; B27K 2240/70; C08L 33/10
See application file for complete search history.

(56) References Cited

U.S. PATENT DOCUMENTS 1,313,461 A 8/1919 Brown
1,966,690 A 7/1934 Van Bergen
(Continued)

FOREIGN PATENT DOCUMENTS

CN 102431067 5/2012
CN 105082282 11/2015
(Continued)

OTHER PUBLICATIONS

How to Choose the Right Needles for a Knitting Project, p. 8, Howcast, Dec. 23, 2017, see: www.howcast.com/videos/165779-how-to-choose-the-right-needles-for-a-knitting-project/.
(Continued)

*Primary Examiner* — Khoa D Huynh
*Assistant Examiner* — Aiying Zhao
(74) *Attorney, Agent, or Firm* — Thomas A. O'Rourke; Bodner & O'Rourke, LLP

(57) ABSTRACT

Each of a set of knitting needles have a length correlated to at least two factors (e.g., needle diameter, and yarn weight) to provide appropriate strength, stability, and suitable take-up for stitches created during the knitting process. The correlation is such that as needle diameters (D) grow, and/or the yarn weight increases, the needle length grows in a particular relation, as follows:

$$L = \frac{(W+2)(15D+15)}{(.4W+2)(.9D+5)}$$

where "L" is the length of the needle, "D" is the needle diameter, and "W" is the yarn weight from 0 to 7 (i.e., lace=0, super fine=1, fine=2, light=3, medium=4, bulky=5, super bulky=6, and jumbo=7). Raw wood for the needle is (Continued)

stabilized in a process including application of a composition that is maintained thereon for a period of time and in a vacuum, and heat treatment.

2 Claims, 4 Drawing Sheets

(51) Int. Cl.
*B27K 5/00* (2006.01)
*B27K 3/08* (2006.01)
*B27K 3/15* (2006.01)
*B27K 5/02* (2006.01)
*C08L 33/10* (2006.01)

(52) U.S. Cl.
CPC ............... *B27K 5/001* (2013.01); *B27K 5/02* (2013.01); *B27K 2240/70* (2013.01); *C08L 33/10* (2013.01)

(56) References Cited

U.S. PATENT DOCUMENTS

| | | | |
|---|---|---|---|
| 2,045,267 A | 6/1936 | Graham | |
| 2,093,631 A | 9/1937 | Burnham | |
| 2,102,600 A | 12/1937 | Miller | |
| 2,183,791 A | 12/1939 | Dunn | |
| 2,364,649 A | 12/1944 | Palliser | |
| 2,507,174 A | 5/1950 | Phillips | |
| 3,280,595 A * | 10/1966 | Linstead | D04B 3/02 66/117 |
| 4,007,610 A | 2/1977 | Linstead | |
| 5,720,187 A * | 2/1998 | Matuo | D04B 3/02 66/117 |
| 6,904,773 B1 * | 6/2005 | Cushman | D04B 3/02 66/1 A |
| 2009/0004395 A1 | 1/2009 | Schneider | |
| 2013/0171358 A1 | 7/2013 | Moore | |
| 2019/0203391 A1 * | 7/2019 | Rasch | D04B 3/02 |

FOREIGN PATENT DOCUMENTS

| | | | |
|---|---|---|---|
| DE | 4308715 | 9/1993 | |
| DE | 202017001294 U1 * | 4/2017 | D04B 3/02 |
| EP | 2406418 | 1/2012 | |
| GB | 2265159 A * | 9/1993 | D04B 3/02 |

OTHER PUBLICATIONS

"Everything You Need to Know About Knitting Needles," M Keegan, Nov. 4, 2013, Woman's Weekly, see: www.womansweekly.com/knitting/knitting-needles-13505/.

Yarn Craft Council, Yarn Standards, Standard Yarn Weight Systems, May 11, 2017, available at: https://www.craftyarncouncil.com/standards/yarn-weight-system.

* cited by examiner

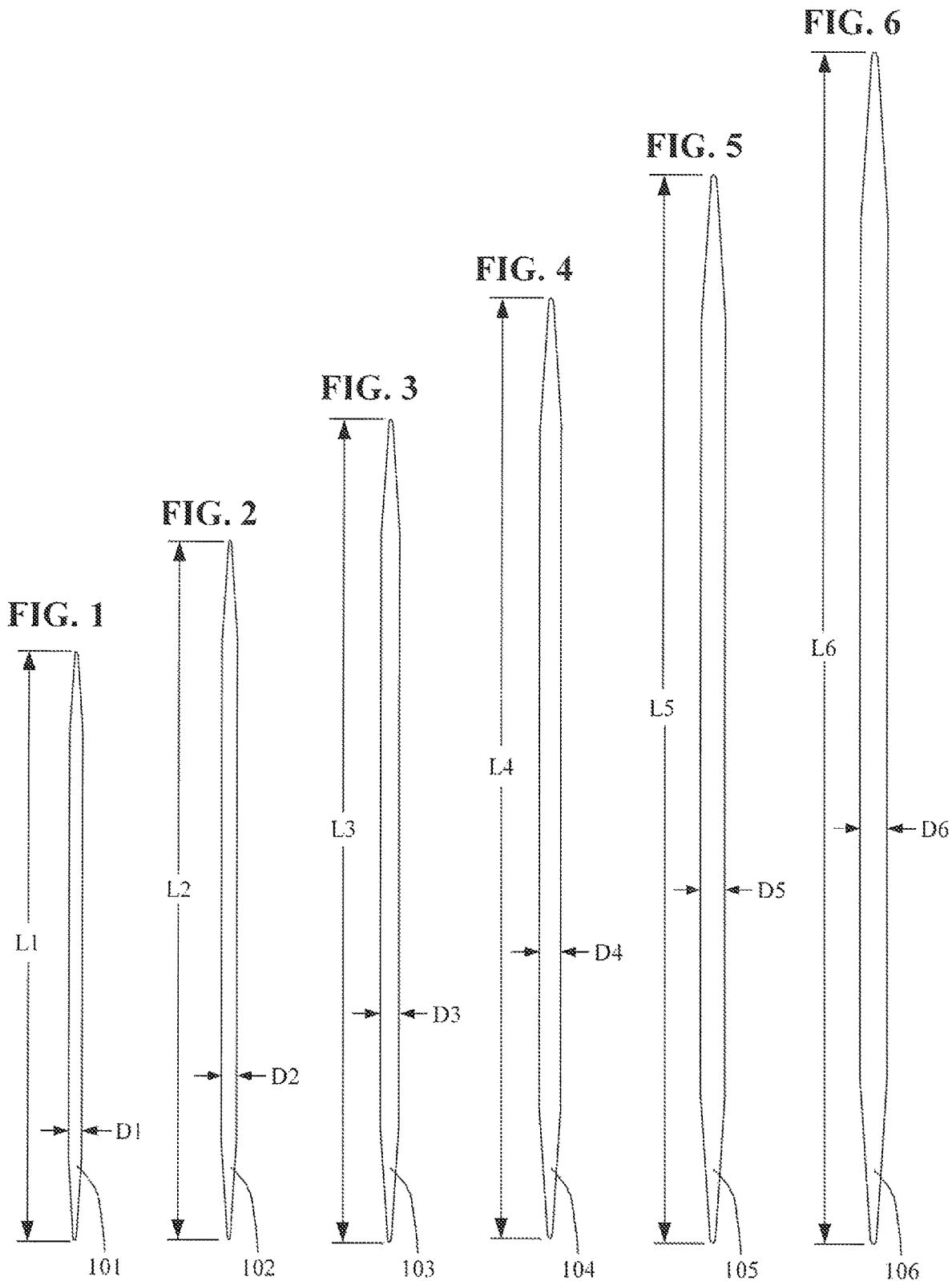

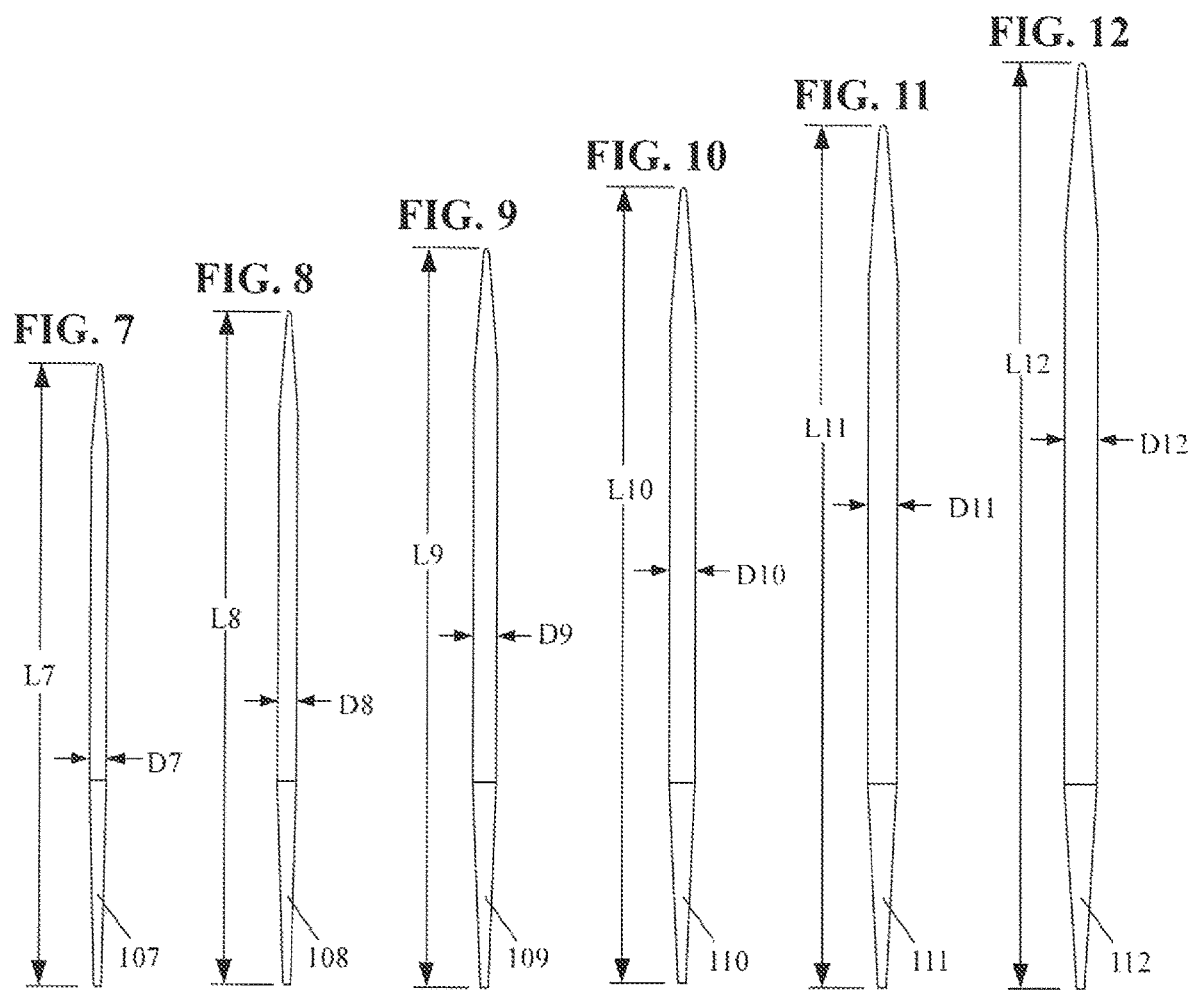
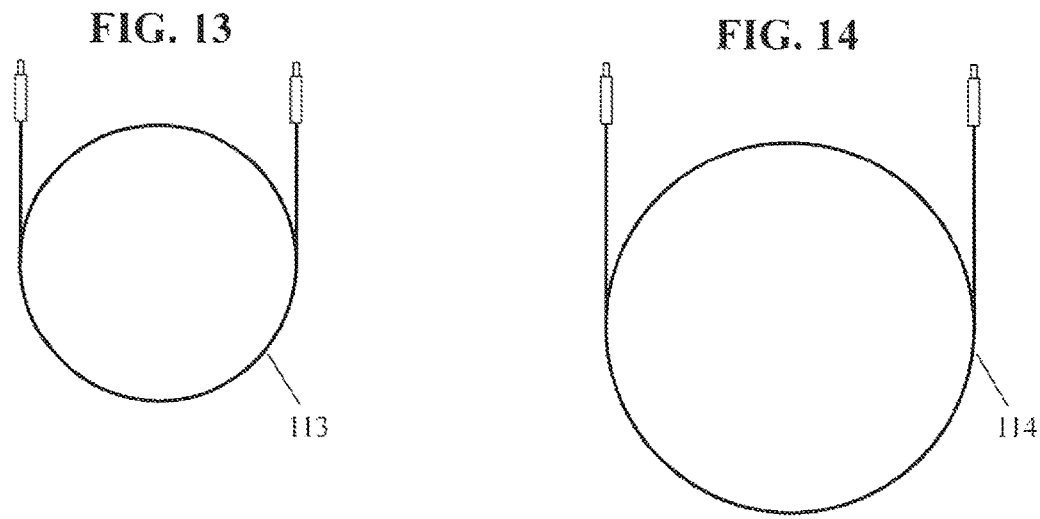

KNITTING NEEDLES

CROSS REFERENCES TO RELATED APPLICATIONS

This application claims priority on U.S. application Ser. No. 62/504,612, filed on May 11, 2017, the disclosures of which are incorporated herein by reference. This application is also incorporating by reference U.S. application Ser. No. 15/822,328, fifed on Nov. 27, 2017, having the title "A Process of Improving the Dimensional Stability of Wood and Dimensional Stabile Wood Thereof," which claims priority on Indian Provisional Patent Application No. 201611004022, filed on Feb. 4, 2016, all disclosures of which are incorporated herein by reference.

FIELD OF THE INVENTION

The present invention relates to knitting needles. A first aspect of the present invention more particularly relates to a process for improving the dimensional stability of the wood used for the knitting needles, and for decreasing its hygroscopicity (i.e., decreasing its reactivity to the moisture content of the air, in the form of absorbing or releasing water vapor). A second aspect of the present invention more particularly relates to formation of a set of knitting needles that are particularly configured to better accommodate more stitches and provide more stability during the knitting process.

BACKGROUND OF THE INVENTION

The process of knitting/crocheting involves the use of at least two needles to interconnect loops of yarn or wool into a garment. The use of needles in a knitting/crocheting process dates back to ancient Egypt, when it was utilized primarily as a means for producing fabric. During the 1980s the availability of low-cost machine-knitted garments caused a sharp decline in the popularity of home knitting and crocheting. However, the early $21^{st}$ century has seen a resurgence in knitting/crocheting, even beyond that of a basic hobby, as evidenced by the 2006 Knitting Olympics, and the emergence of the social networking site "Ravelry" for the international community of knitters, weavers, spinners, and crocheters.

There have been a number of knitting needle configurations conceived for assisting the knitter with particular aspects of the knitting process, as shown by the following.

U.S. Pat. No. 1,313,461 to Brown is for an improved knitting needle for knitting tubular articles. The Brown knitting needle is made of an L-shaped knitting end and an L-shaped knitting off end, which two L-shapes are connected by a flexible body made of two metal springs.

U.S. Pat. No. 2,045,267 to Graham is for a duplex knitting needle in which each enlarged knitting point is connected to a reduced central strand by a stepped intermediate take-off section that facilitates sliding of the work over the take-off section.

U.S. Pat. No. 2,093,631 to Burnham is for a knitting needle that is constructed to be used with a crochet action instead of ordinary knitting motion, enabling the knitter to hold the thread in the left hand instead of the right to eliminate movement required for throwing the loop over the needle. The Burnham knitting needle also includes interchangeable points with threadable connections, so the knitting operation could easily be reversed by exchanging the points, obviating the need for reversing the needle in the knitting process.

U.S. Pat. No. 2,507,174 to Phillips is for a band type knitting needle with a left element, a right element, and a flexible connecting member that is oval in cross-section, and which includes one tip usable in a crochet action.

U.S. Pat. No. 2,364,649 to Palliser is for a needle configured for knitting a cable stitch, having knurling formed deep enough that the stitches will not tend to slide along the needle. The Palliser needle is disclosed as being made of material which has been found to be suitable for knitting needles, which is disclosed as being steel, aluminum, or other metals, plastics, or woods, but the harder materials are preferable because of the reduced likelihood of the knurling wearing smooth.

During the process of knitting, a needle with a particular needle diameter is chosen and utilized based in part upon the size of the yarn selected for the garment. However, little consideration is given to the lengths of the needles, which must retain the loops of the knit yarn thereon. Often, the advice of expert commentators is to either just use the needle length specified on a pattern, if the person is using a pattern, or to just choose a length that feels manageable and comfortable in your hands.

Therefore, a first aspect of the present invention provides a mathematical relationship for specifying appropriate needle lengths for a set of needles for use in an improved knitting process.

A second aspect of the present invention relates to improving the material used for the knitting needles.

Antique knitting needles were sometimes made of ivory (e.g., from various tusks), and wood sticks were also used. Although knitting needles today are made from a variety of materials, including metal, bamboo, plastic, bone, glass, and carbon fiber, wood is still generally preferred because of the feel that it provides.

The composition of wood varies from species to species, but is mainly composed of about 40% to 45% cellulose, and about 20% to 33% lignin, with the remaining 32% to 37% being composed of hemicellulose, typically glucomannan, glucuronoxylan, and other polysaccharides. Due to the large number of hydroxyl groups present in wood, its internal water content will change with ambient temperature and humidity changes. Such changes in the water content of a wood product, particularly knitting needles, may affect its dimensional features and stability in all directions, because altering its internal moisture during the absorption and/or desorption process may cause swelling and/or shrinkage of the wood. The swelling/shrinkage may result in uneven expansion and contraction, warping, deformation, cracks and other defects, and may make the wood dry and brittle which may degrade the usefulness and/or the longevity of the wood product.

Another drawback of using wood is its susceptibility to biodegradation, such as degradation due to the presence of bacteria, fungi, insects, etc., which may change the properties of wood, including effecting the permeability of the wood.

Accordingly, certain wood treatment processes have been developed to preserve the quality of wood and increase its life and durability, which processes typically involve impregnating the wood with chemical compounds to make it water resistant, and to increase its density and durability. Such processes normally involve cold soaking or forcing solvents into wood under high pressure, and subsequently exposing the wood to high temperatures.

Chinese Patent Pub. No. CN102431067B discloses pretreatment of wood using pressurized superheated steam, followed by stress relief for improved dimensional stability.

Chinese Patent Publication No. CN105082282 discloses a method of improving the dimensional stability of wood that includes soaking/injecting the wood in/with petroleum wax, for reducing the moisture content of the wood.

U.S. Patent Application Pub. No. 2013/0171358 discloses a wood treatment method and apparatus. The apparatus is a treatment vessel having a hold-down system for securing a bundle of wood within the interior of the vessel, which is operable to counteract large buoyant forces associated with submersing the bundle of wood in a liquid reagent. The hold-down system can also serve to maintain the shape of the bundle during treatment.

U.S. Patent Application Pub. No. 2009/0004395 discloses a process for the furfurylation of wood (i.e., wood modified with polymerized furfuryl alcohol). In the process, water-based furfural-urea resins are impregnated into the wood in order to impart decay, mold, marine borer and termite resistance, and improve moisture resistance and mechanical properties.

However, the furfurylation process results in wood with an Anti-Swelling-Efficiency value (ASE), which is considered to be a measure of the dimensional stability of wood, of about 60%, and also results in a weight gain of about 30%. The furfurylation process also releases undesirable volatile organic compounds (VOC) during the curing process. In addition, furfurylation also results in increased brittleness of the wood. The characteristics, expense and complexity of these processes for enhancing the dimensional stability of wood limits its commercial usefulness.

Moreover, there are environmental and health concerns with the chemical modification process, and the chemical treatment of wood may also undesirably change the properties of the wood.

Thus, an improved and efficient wood treatment process to create highly durable and stable wood that is easy to machine and turned into various products is still needed.

Objects of the Invention

It is an object of the invention to provide a knitting needle set that may be used for knitting various garment types and sizes.

It is another object of the invention to provide an improved knitting needle set in which each of the needles has an appropriate length in accordance with its diameter.

It is a further object of the invention to provide an improved knitting needle set in which each of the needles has an appropriate length in accordance with the weight of the yarn to be used.

It is another object of the invention to provide an improved knitting needle set in which each of the needles has an appropriate length in accordance with its diameter and the weight of the yarn to be used.

It is a further object of the invention to provide a wooden knitting needle configuration that is less susceptible to warpage and degradation.

It is another object of the present invention to provide a process for improving the dimensional stability of wood.

It is another object of the present invention to provide a process that increases the dimensional, stability, density, and the durability of wood.

It is yet another object of the present invention to provide a process for the stabilization of wood that reduces the hygroscopicity of the wood.

It is further another object of the present invention to provide a process that produces stabilized wood that can be easily machined to be shaped into cylindrical and circular objects, including, but not limited to, circular knitting needles.

It is still another object of the present invention to provide an economical and efficient process for stabilization of wood.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the present invention, a number of double-ended knitting needles forming a set of knitting needles may each have a length (L) that is particularly correlated to the needle diameter and the yarn weight (W) to be used in the knitting process, to provide appropriate strength, stability, and take-up for stitches created while knitting. The correlation may be such that the length increases for increasing needle diameter (D), and also increases for increasing yarn weight, as follows:

$$L = \frac{(W+2)(15D+15)}{(.4W+2)(.9D+5)}$$

wherein the yarn weight W is an integer from 0 to 7, where 0 is for a lace yarn weight, where 1 is for a super fine yarn weight, where 2 is for a fine yarn weight, where 3 is for a light yarn weight, where 4 is for a medium yarn weight, where 5 is for a bulky yarn weight, where 6 is for a super bulky yarn weight, and where 7 is for a jumbo yarn-weight.

In accordance with at least a second embodiment of the present invention, a number of pairs of needles form a set of circular knitting needles, where each of the pair of needles are re leasable securable to a cable. Each of the needles of the pair may have a length (L) particularly correlated to needle diameter and yarn weight (W) to provide appropriate strength, stability, and take-up for stitches created during the knitting process. The correlation may be such that the length increases for increasing needle diameter (D), and increases for increasing yarn weight, as follows:

$$L = \frac{(W+2)(10D+15)}{(.6W+2)(.85D+5)}$$

Another aspect of the present invention is a process for improving the dimensional stability of wood that may be used to make the knitting needles disclosed herein, or for making any other knitting needle known in the art. The process includes applying a first composition to the wood, where the first composition includes a resin, a dye, and a catalyst. The composition covered wood is then placed in a vacuum atmosphere for a first period of time. The wood is then removed from the vacuum and maintained at room temperature and pressure for a second period of time. A second composition is then applied to the wood, where the second composition may include a resin, which may be the same resin as in the first composition, and the dye, which may be the same dye as in the first composition. The composition covered wood is then placed in a vacuum atmosphere for a third period of time. The wood is then removed from the vacuum and is maintained at room temperature and pressure for a fourth period of time. Next the wood is heated to at least 100 degrees Celsius for a fifth period of time, after which the heal is gradually removed throughout a sixth period of time. The gradual removal of heat may also occur linearly.

BRIEF DESCRIPTION OF THE DRAWINGS

The description of the various example embodiments is explained in conjunction with appended drawings, in which:

FIG. 1 illustrates a front view of a first knitting needle of a set of knitting needles, the size of which is constructed in accordance with the present invention;

FIG. 2 illustrates a front view of a second knitting needle of a set of knitting needles, the size of which is constructed in accordance with the present invention;

FIG. 3 illustrates a front view of a third knitting needle of a set of knitting needles, the size of which is constructed in accordance with the present invention;

FIG. 4 illustrates a front view of a fourth knitting needle of a set of knitting needles, the size of which is constructed in accordance with the present invention;

FIG. 5 illustrates a front view of a fifth knitting needle of a set of knitting needles, the size of which is constructed in accordance with the present invention;

FIG. 6 illustrates a front view of a sixth knitting needle of a set of knitting needles, the size of which is constructed in accordance with the present invention;

FIG. 7 illustrates a front view of a first knitting needle of a set of knitting needles that may form a set of interchangeable circular knitting needles, the size of which needle is constructed in accordance with the present invention;

FIG. 8 illustrates a front view of a second knitting needle of a set of knitting needles that may form a set of interchangeable circular knitting needles, the size of which is constructed in accordance with the present invention;

FIG. 9 illustrates a front view of a third knitting needle of a set of knitting needles that may form a set of interchangeable circular knitting needles, the size of which is constructed in accordance with the present invention;

FIG. 10 illustrates a front view of a fourth knitting needle of a set of knitting needles that may form a set of interchangeable circular knitting needles, the size of which is constructed in accordance with the present invention;

FIG. 11 illustrates a front view of a fifth knitting needle of a set of knitting needles that may form a set of interchangeable circular knitting needles, the size of which is constructed in accordance with the present invention;

FIG. 12 illustrates a front view of a sixth knitting needle of a set of knitting needles that may form a set of interchangeable circular knitting needles, the size of which is constructed in accordance with the present invention;

FIG. 13 illustrates a first cable that may be coupled to a pair of any one of the knitting needles shown in FIGS. 7-12;

FIG. 14 illustrates a second cable that may be coupled to a pair of any one of the needles shown in FIGS. 7-12;

DETAILED DESCRIPTION OF THE INVENTION

Figure 15:
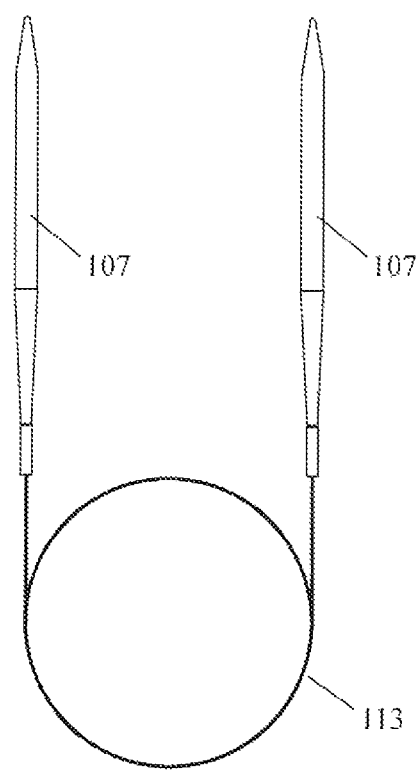
FIG. 15 illustrates a pair of the needles shown in FIG. 7 each releasably coupled to the cable shown in FIG. 13.
Figure 16:
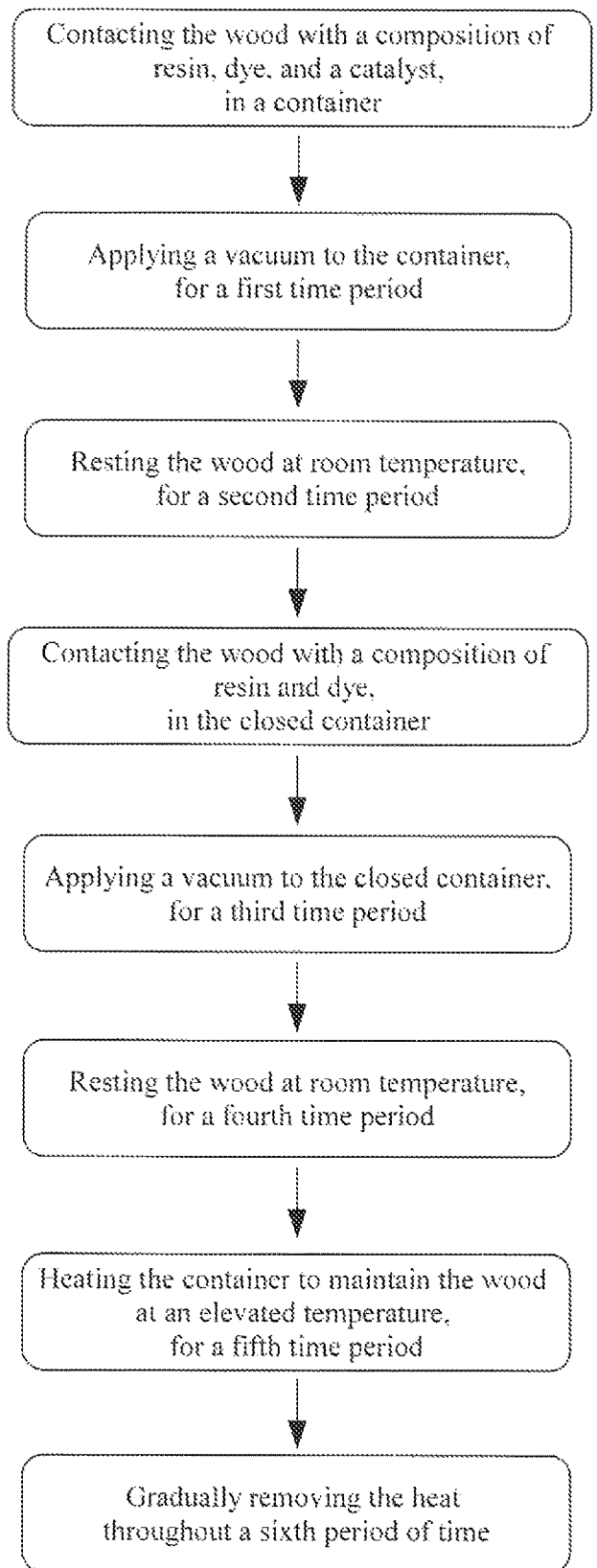
FIG. 16 schematically illustrates a process for improving the dimensional stability of wood in accordance with one embodiment of the present invention.

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C" and "A, B, and/or C" mean all of the following possible combinations: A alone; or B alone; or C alone; or A and B together; or A and C together; or B and C together; or A, B and C together.

Also, all patents, published patent applications, and non-patent literature that are cited within this document are incorporated herein in their entirety by reference.

Furthermore, the described features, advantages, and characteristics of any particular embodiment disclosed, herein, may be combined in any suitable manner with any of the other embodiments disclosed herein.

Yarn is sold in categories of "yarn weight" that are promulgated by the Yarn Craft Counsel, i.e., lace (0), super fine (1), fine (2), light (3), medium (4), bulky (5), super bulky (6), and jumbo (7), which categories have a corresponding knit gauge range in stockinette stitch to 4 inches, as follows: 33-40 sts, 27-32 sts, 23-26 sts, 21-24 sts, 16-20 sts, 12-15 sts, 7-11 sts, and 6 and fewer sts.

A general rule for knitting is that the heavier the weight of the yarn to be used for a project, the larger the diameter of the needle that should be used with it, and the bigger the stitches it will make, requiring fewer of them. Conversely, the thinner the yarn, the smaller the diameter of the needle that should be used with it and the smaller the stitches it will make, requiring more of those stitches.

Knitting needles are standardized with respect to the needle's diameter, and the chart below shows the standard needle diameter sizes used in both the U.S. and in the U.K.:

| Diameter | U.S. | U.K. |
| --- | --- | --- |
| 1.25 mm | 0000 | — |
| 1.5 mm | 000 | — |
| 1.75 mm | 00 | — |
| 2 mm | 0 | 14 |
| 2.25 mm | 1 | 13 |
| 2.75 mm | 2 | 12 |
| 3 mm | — | 11 |
| 3.25 mm | 3 | 10 |
| 3.5 mm | 4 | — |
| 3.75 mm | 5 | 9 |
| 4 mm | 6 | 8 |
| 4.5 mm | 7 | 7 |
| 5.0 mm | 8 | 6 |
| 5.5 mm | 9 | 5 |
| 6 mm | 10 | 4 |
| 6.5 mm | 10½ | 3 |
| 7 mm | — | 2 |
| 7.5 mm | — | 1 |
| 8 mm | 11 | 0 |
| 9 mm | 13 | 00 |
| 10 mm | 15 | 000 |
| 12 mm | 17 | — |
| 16 mm | 19 | — |

-continued

| Diameter | U.S. | U.K. |
|---|---|---|
| 19 mm | 35 | — |
| 25 mm | 50 | — |

Therefore, during the process of knitting, a needle having a particular diameter is generally chosen and utilized based upon the size of the yarn selected for the garment. However, little consideration is given to the lengths of the needles, which retain the loops of the knit yarn thereon. Often, the advice of expert commentators is to either just use the needle length specified on a pattern, which is acceptable for the scenarios where the knitter may be using a pattern, or to just choose a length that feels manageable and comfortable in the person's hands, (see "How to Choose the Right Needles for a Knitting Project," www.howcast.com/videos/165779-how-to-choose-the-right-needles-for-a-knitting-project/). Some commentators suggest that the length of the needle chosen for a particular project may depend upon the knitter's own personal technique, and also upon the number of stitches to be worked on (see, "Everything You Need to Know About Knitting Needles," www.womansweekly.com/knitting/knitting-needles-13505/).

A first embodiment of the present invention is directed to a set of knitting needles in which the length (L) of each particular needle is correlated to at least two factors to provide appropriate strength and needle stability, and suitable take-up for the stitches created during the knitting process. These factors may include: the needle diameter; and the yarn weight, with the resultant larger sized loops required for heavier yarn weight needing to be carried upon a larger needle. In general, the correlation is such that as the needle diameter (D) grows, and/or as the yarn weight increases, the length (L) of the needle grows in a particular relation.

FIGS. 1-6 each illustrate a needle (i.e., needles 101, 102, 103, 104, 105, and 106) that together form a set of needles that are illustrative of such a set that possesses correlated diameters and lengths. It is noted that a set of needles formed in accordance with the present invention is not limited to the set of six needles shown within FIGS. 1-6, and may include fewer needles, or alternatively may include a greater number of needles, and may include each of the standard needle diameters listed in the table shown hereinabove, or any other needle diameters that may later tend to be used.

The knitting needle 101 in FIG. 1 is formed in accordance with the present invention to have a diameter D1, and a correlated length L1. The knitting needle 102 in FIG. 2 is formed in accordance with the present invention to have a diameter D2, and a correlated length L2. The knitting needle 103 in FIG. 3 is formed in accordance with the present invention to have a diameter D3, and a correlated length L3. The knitting needle 104 in FIG. 4 is formed in accordance with the present invention to have a diameter D4, and a correlated length L4. The knitting needle 105 in FIG. 5 is formed in accordance with the present invention to have a diameter D5, and a correlated length L5. The knitting needle 106 in FIG. 6 is formed in accordance with the present invention to have a diameter D6, and a correlated length L6.

Merely to be illustrative, the needles 101-106 may respectively be the U.S. needles sizes 0000, 1, 6, 10, 17, and 50. Thus, for this example, for needle 101, D1=1.25 mm; for needle 102, D2=2.25 mm; for needle 103, D3=4.0 mm; for needle 104, D4=6.0 mm; for needle 105, D5=12 mm; and for needle 106, D6=50 mm.

In accordance with a first embodiment of the present invention, the correlated length (L) for each needle in this set, or any other set, may be determined/escalated in accordance with the following equation:

$$L = \frac{(W+2)(15D+15)}{(.4W+2)(.9D+5)}$$

where "L" is the length of the needle, "D" is the needle diameter, and "W" is the yarn weight from 0 to 7 (i.e., lace=0, super fine=1, fine=2, light=3, medium=4, bulky=5, super bulky=6, and jumbo=7).

Therefore, for example, where lace yarn is being used (i.e., W=0, with a needle size 0000 having a diameter of 1.25 mm, the length L=5.5 inches, but where jumbo yarn is being used (i.e., W=7), with a needle size 0000 having a diameter of 1.25 mm, the length L=10.3 inches.

Similarly, for example, where lace yarn is being used (W=0), with a needle size 50 having a diameter of 25 mm, the needle length L=14.2 inches, but where jumbo yarn (W=7) is being used with a needle size 50 having a diameter of 25 mm, the needle length L=26 inches.

The above disclosed length correlation may analogously be utilized for pairs of needles that may form a set of interchangeable circular knitting needles, where the pairs of needles may be interchangeably coupled to any one of several different cable sizes (e.g., cable 113 or cable 114 in FIG. 13 and FIG. 14), to be coupled together as illustrated in FIG. 15.

FIGS. 7-12 each illustrate one needle (i.e., needles 107, 108, 109, 110, 111, and 112) from such pairs of needles that together form a set of needles that are illustrative of such a set that possesses correlated diameters and lengths. It is noted that this set of needles formed in accordance with this embodiment is similarly not limited to the set of six needles shown within FIGS. 7-12, and may have fewer needle pairs, or alternatively may include a greater number of needles.

The knitting needle 107 in FIG. 7 is formed in accordance with the present invention to have a diameter D7, and a correlated length L7. The knitting needle 108 in FIG. 8 is formed in accordance with the present invention to have a diameter D8, and a correlated length L8. The knitting needle 109 in FIG. 9 is formed in accordance with the present invention to have a diameter D9, and a correlated length L9. The knitting needle 110 in FIG. 10 is formed in accordance with the present invention to have a diameter D10, and a correlated length L10. The knitting needle 111 in FIG. 11 is formed in accordance with the present invention to have a diameter D11, and a correlated length L11. The knitting needle 112 in FIG. 12 is formed in accordance with the present invention to have a diameter D12, and a correlated length L12.

Merely to be illustrative, the needles 107-112 may respectively be the U.S. needles sizes 3, 5, 7, 9, 11, and 13. Thus, for this example, for needle 107, D7=3.25 mm; for needle 108, D8=3.75 mm; for needle 109, D9=4.5 mm; for needle 110, D10=5.5 mm; for needle 11, D11=8 mm; and for needle 112, D12=9 mm.

In accordance with this embodiment, the correlated length (L) for each needle in this set, or any other set, may be determined/escalated in accordance with the following equation:

$$L = \frac{(W+2)(10D+15)}{(.6W+2)(.85D+5)}$$

where "W" is a yarn weight, "L" is a needle length, and "D" is a needle diameter; and where the yarn weight "W" is an integer from 0 to 7, where 0 is for a lace yarn weight which has a corresponding knit gauge range in stockinette stitch to 4 inches of 33-40 stitches, where 1 is for a super fine yarn weight which has a corresponding knit gauge range in stockinette stitch to 4 inches of 27-32 stitches, where 2 is for a fine yarn weight which has a corresponding knit gauge range in stockinette stitch to 4 inches of 23-26 stitches, where 3 is for a light yarn weight which has a corresponding knit gauge range in stockinette stitch to 4 inches of 21-24 stitches, where 4 is for a medium yarn weight which has a corresponding knit gauge range in stockinette stitch to 4 inches of 16-20 stitches, where 5 is for a bulky yarn weight which has a corresponding knit gauge range in stockinette stitch to 4 inches of 12-15 stitches, where 6 is for a super bulky yarn weight which has a corresponding knit gauge range in stockinette stitch to 4 inches of 7-11 stitches, and where 7 is for a jumbo yarn weight which has a corresponding knit gauge range in stockinette stitch to 4 inches of 6 and fewer stitches.

Therefore, for example, where lace yarn is being used (i.e., W=0), with a needle size 3 having a diameter of 3.25 mm, the length L=6.1 inches, but where jumbo yarn is being used (i.e., W=7), with a needle size 3 having a diameter of 3.25 mm, the length L=8.9 inches.

Similarly, for example, where lace yarn is being used (W=0), with a needle size 13 having a diameter of 9 mm, the needle length L=8.3 inches, but where jumbo yarn (W−7) is being used with a needle size 13 having a diameter of 9 mm, the needle length L=12 inches.

In accordance with a third embodiment of the present invention, the correlated length for each needle in the set may be escalated in the range of a 30/1 ratio to a 180/1 ratio. In a more preferred embodiment, the correlated length for each needle in the set may be escalated in the range of a 40/1 ratio to a 130/1 ratio. In a most preferred embodiment, the correlated length for each needle in the set may be escalated in the range of a 60/1 ratio to a 94/1 ratio.

Another aspect of the present invention is a process for improving the dimensional stability of wood that may be used for making the knitting needles disclosed herein, or for making any other wood knitting needle known in the art, or even for making other wood products.

The process includes applying a first composition to the wood, where the first composition includes a resin, a dye, and a catalyst. The composition-covered wood may then be placed in a vacuum atmosphere for a first period of time. The wood is then removed from the vacuum atmosphere (e.g., air may be allowed in to re-pressurize a vacuum container), and the wood is maintained at room temperature and pressure for a second period of time. A second composition is then applied to the wood, where the second composition may include a resin, which may be the same resin as in the first composition, and a dye, which may be the same dye as in the first composition. The composition-covered wood is then placed in a vacuum atmosphere for a third period of time. The wood is then removed from the vacuum and is maintained at room temperature and pressure for a fourth period of time. Next the wood is heated to an elevated temperature for a fifth period of time, after which the heat is gradually removed throughout a sixth period of time, to produce wood having improved properties.

In one embodiment, the gradual removal of heat may occur linearly. In another embodiment, the gradual removal of heat may occur in a non-linear manner. For example, the heat removal may be slower at the beginning of the sixth period, but the rate of heal removal may increase as time progresses, to provide for a more moderate initial transition away from the elevated temperature condition.

In one embodiment, the resin used in one or both compositions may be a heat cured sealant that may tend to impregnate porous materials. For example, the resin used may be the product sold wider the trademark name of LOCTITE® Resinol® 90C™, which is sold by Henkel Corporation. The elevated temperature used during the fifth period of time will correspond to the particular resin that is used. For example, where the resin used is the LOCTITE® Resinol® 90C™, the elevated temperature will be at least 80 degrees in order for it to form a durable thermoset plastic, per its specifications, and the elevated temperature may more preferably be at least 100 degrees Celsius.

In one embodiment, a ratio of the catalyst to the resin may be in the range of 1.7 gm/lit to 2.7 gm/lit, and may more preferably be in the range of 1.9 gm/lit to 2.5 gm/lit, and may most preferably be in the range of 2.1 gm/lit to 2.3 gm/lit.

In one embodiment the dye used may be an oil soluble dye. Also, in one embodiment the dye may also be selected to match a shade of the wood, and in another embodiment the dye may be selected to be different than the shade of the wood itself.

In one embodiment, the first period of time may be for a period of at least 30 minutes, and may more preferably be for a period of 1 hour, and may most preferably be for a period of 2 hours.

In one embodiment, the second period of time may be for a period of at least 12 hours, and may more preferably be for a period of 24 hours, and may most preferably be for a period of 48 hours.

In one embodiment, the third period of time may be for a period of at least 30 minutes, and may more preferably be for a period of one hour, and may most preferably be for a period of two hours.

In one embodiment, the fourth period of time may be for a period of at least 12 hours, and may more preferably be for a period of at least 18 hours, and may most preferably be for a period of 24 hours.

During the second and fourth periods of time, the room temperature condition may be a temperature between 10 degrees to 35 degrees Celsius, and may more preferably be a temperature between 15 degrees to 30 degrees Celsius, and may most preferably be a temperature in the range typically used for scientific work, being between 20 degrees to 25 degrees Celsius.

In one embodiment, after the wood is removed from the vacuum chamber, it may be wrapped in a material such as an aluminum foil, before it is exposed to elevated temperature, which may occur in an oven, and may be for a period of about one hour and 30 minutes. The invention encompasses other temperature ranges that may be known or obvious to a person skilled in the art. The time for which the wood may be placed inside the preheated oven may depend upon several factors such as the type of wood, the size and shape of the wood billet, the temperature of the oven, the stabilizing material used in the previous step, etc. Thus, other time ranges, are also encompassed by the present invention.

Also, in one embodiment the room pressure may be at least that found at a 10,000 foot altitude above mean sea level (i.e., at least 10.11 psi), and in another embodiment the pressure may be at least that found at a 5,000 foot altitude above mean sea level (i.e., at least 12.23 psi), and in another embodiment the pressure may be at least that at a sea level (i.e., Standard atmospheric pressure of 14.7 psi).

In one embodiment, the fifth period of time may be for a period of at least 30 minutes, and may more preferably be for a period of at least 1 hour, and may most preferably be for a period of about 1.5 hours.

In one embodiment, the sixth period of time may be for a period of about one hour, and may more preferably be for a period of at least 3 hours, and may most preferably be for a period of about 6 hours.

During the first and third periods of time, the vacuum atmosphere may preferably be a vacuum atmosphere of 3000 Pa or lower, and may more preferably be a vacuum atmosphere of 10 Pa or lower, and may most preferably be a vacuum atmosphere of 0.1 Pa or lower.

It should be noted that the vacuum may be created within a stabilizing chamber using one or more vacuum pumps coupled to the chamber. Creation of a vacuum inside the stabilizing chamber may lead to release of air bubbles from the stabilizing material (i.e., the composition) that covers the wood material, which may result in better impregnation of the stabilizing material into the wooden. The vacuum inside the stabilizing chamber may preferably be maintained until the air bubbles are no longer released, which is roughly for the above-noted time periods.

In one embodiment, the wood that is treated in accordance with the process disclosed herein may be the wood knitting needle after it is already in its final form. In another embodiment, the wood that is treated may be a wood block that is very close in shape and size to the needle that is to be formed therefrom. In yet another embodiment, the wood that is treated may be a wood plank.

The wood produced as a result of the process described herein is harder, stronger and can be easily machined into a desired shape, which may be for the herein disclosed knitting needles, or for other wood products that may require similarly improved wood properties.

The disclosed process has several advantages which are:
1) providing wood with improved dimensionally stable properties;
2) providing cost effective dimensionally stable wood; and
3) providing high quality dimensionally stable wood that can be easily machined into desired shapes, such as cylindrical and circular shaped objects.

In one embodiment the process for improving the dimensional stability of wood may include some or all of the following:
(a) applying a first composition to the wood, the first composition comprising a resin, a dye, and a catalyst;
(b) placing the wood in a vacuum atmosphere for a first period of time;
(c) removing the wood from the vacuum atmosphere and retaining the wood at room temperature and pressure for a second period of time;
(d) applying a second composition to the wood, the second composition comprising the resin and the dye;
(e) applying a vacuum treatment during the contact step for a third period of time;
(f) removing the wood from the vacuum and retaining the wood at room temperature and pressure for a fourth period of time;
(g) placing the wood into an oven preheated to an elevated temperature for a fifth period of time;
(h) gradually removing the heat in the oven over a sixth period of time;
(i) wherein the resin comprises a heat cure sealant; and wherein the elevated temperature is at least a temperature needed to cure the resin;
(j) wherein a ratio of the catalyst to the resin is in the range of 2.1 gm/lit to 2.3 gm/lit;
(k) wherein the dye comprises an oil soluble dye;
(l) wherein the dye is selected to match a shade of the wood;
(m) wherein said contacting of the wood with the first composition is in a closed container;
(n) wherein said first period of time is for a period of at least 2 hours;
(o) wherein said second period of time is for at least 48 hours;
(p) wherein said third period of time is for a period of at least 2 hours;
(q) wherein said fourth period of time is for a period of at least 24 hours;
(r) wherein said fifth period of time is for a period of about 1.5 hours;
(s) wherein said sixth period of time is for a period of about 6 hours;
(t) wherein said placing of the wood in a vacuum atmosphere preferably comprises placing the wood in a vacuum atmosphere of 3000 Pa or lower;
(u) wherein said placing of the wood in a vacuum atmosphere more preferably comprises placing the wood in a vacuum atmosphere of 10 Pa or lower; and
(v) wherein said placing of the wood in a vacuum atmosphere most preferably comprises placing the wood in a vacuum atmosphere of 0.01 Pa or lower.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A number of pairs of needles forming a set of circular knitting needles, each said pair of needles being releasably securable to a cable, and each of said pair of needles of said set of circular knitting needles comprising: a length (L), in inches, particularly correlated to a needle diameter and a yarn weight (W) to provide appropriate strength, stability, and take-up for stitches created during a knitting process, said correlation being such that said length increases for increasing needle diameter (D), in millimeters, and increasing yarn weight, as follows:

$$L = \frac{(W+2)(10D+15)}{(.6W+2)(.85D+5)}$$

wherein the yarn weight "W" is an integer from 0 to 7, where 0 is for a lace yarn weight which has a corresponding knit gauge range in stockinette stitch to 4 inches of 33-40 stitches, where 1 is for a super fine yarn weight which has a corresponding knit gauge range in stockinette stitch to 4 inches of 27-32 stitches, where 2 is for a fine yarn weight which has a corresponding knit gauge range in stockinette stitch to 4 inches of 23-26 stitches, where 3 is for a light yarn weight which has a corresponding knit gauge range in stockinette stitch to 4 inches of 21-24 stitches, where 4 is for a medium yarn weight which has a corresponding knit gauge range in stockinette stitch to 4 inches of 16-20 stitches, where 5 is for a bulky yarn weight which has a corresponding knit gauge range in stockinette stitch to 4 inches of 12-15 stitches, where 6 is for a super bulky yarn weight which has a corresponding knit gauge range in stockinette stitch to 4 inches of 7-11 stitches, and where 7 is for a jumbo yarn weight which has a corresponding knit gauge range in stockinette stitch to 4 inches of 6 and fewer stitches.

2. The number of pairs of needles forming a set of circular knitting needles according to claim 1, wherein the diameter D is a standard needle diameter size from the group of needle diameter sizes consisting of: 1.25 mm, 1.5 mm, 1.75 mm, 2 mm, 2.25 mm, 2.75 mm, 3 mm, 3.25 mm, 3.5 mm, 3.75 mm, 4 mm, 4.5 mm, 5.0 mm, 5.5 mm, 6 mm, 6.5 mm, 7 mm, 7.5 mm, 8 mm, 9 mm, 10 mm, 12 mm, 16 mm, 19 mm, and 25 mm.

\* \* \* \* \*